US010724243B2

United States Patent
Leitch et al.

(10) Patent No.: US 10,724,243 B2
(45) Date of Patent: Jul. 28, 2020

(54) PROCESS FOR IN-LINE EXTRUSION OF COATING ONTO ROOFING SHINGLES DURING MANUFACTURING AND ROOFING SHINGLES MADE BY THE PROCESS

(71) Applicant: Building Materials Investment Corporation, Dallas, TX (US)

(72) Inventors: Olan Thomas Leitch, Bakersfield, CA (US); Mark Logan Keaten, Waxahachie, TX (US); Matti Kiik, Richardson, TX (US)

(73) Assignee: Building Materials Investment Corporation, Dallas, TX (US)

( * ) Notice: Subject to any disclaimer, the term of this patent is extended or adjusted under 35 U.S.C. 154(b) by 764 days.

(21) Appl. No.: 15/180,940

(22) Filed: Jun. 13, 2016

(65) Prior Publication Data

US 2016/0369509 A1 Dec. 22, 2016

Related U.S. Application Data

(60) Provisional application No. 62/180,377, filed on Jun. 16, 2015, provisional application No. 62/296,903, filed on Feb. 18, 2016.

(51) Int. Cl.
*E04D 1/20* (2006.01)
*B26D 3/10* (2006.01)
(Continued)

(52) U.S. Cl.
CPC ................ *E04D 1/20* (2013.01); *B26D 3/10* (2013.01); *B32B 5/02* (2013.01); *B32B 5/022* (2013.01);
(Continued)

(58) Field of Classification Search
CPC ......... B65B 25/00; B65B 35/50; B65B 61/00; B65B 63/08; B05C 5/0245; B05C 9/12; B05C 9/14; Y10T 428/2443; E04D 2001/005
USPC .... 53/435, 440, 447, 520, 127, 540; 52/518; 428/141, 150; 427/209, 180; 118/325, 118/419
See application file for complete search history.

(56) References Cited

U.S. PATENT DOCUMENTS 1,365,947 A * 1/1921 Overbury ................ B65B 23/20
493/352
3,694,119 A * 9/1972 Scheibling ............ B29C 47/065
264/173.12
(Continued)

*Primary Examiner* — Hemant Desai
*Assistant Examiner* — Veronica Martin
(74) *Attorney, Agent, or Firm* — Womble Bond Dickinson (US) LLP

(57) ABSTRACT

A process for in-line extrusion of polymeric coatings onto roofing shingles during manufacturing includes moving a web of shingle substrate material in a downstream direction and extruding a liquefied coating of polymeric material onto at least one surface of the moving web to form a thin film. The liquefied coating may be a molten polymeric material that forms a thin film on a back surface of the shingle material to prevent sticking and eliminate the need for a traditional back dusting with material such as powdered stone. The polymeric film further may be applied to the substrate material in lieu of a saturation coating of asphalt, thus reducing cost and weight while providing a comparable moisture barrier and a lighter more flexible shingle.

12 Claims, 3 Drawing Sheets

(51) Int. Cl.
  *D06N 5/00* (2006.01)
  *B32B 5/02* (2006.01)
  *B32B 11/04* (2006.01)
  *B32B 27/16* (2006.01)
  *B32B 11/10* (2006.01)
  *B32B 11/02* (2006.01)
  *B32B 37/15* (2006.01)
  *B32B 7/12* (2006.01)
  *B32B 27/12* (2006.01)
  *B32B 37/08* (2006.01)
  *B32B 39/00* (2006.01)
  *B32B 38/00* (2006.01)
  *B29C 48/155* (2019.01)
  *B29C 48/07* (2019.01)

(52) U.S. Cl.
  CPC ........... *B32B 7/12* (2013.01); *B32B 11/02* (2013.01); *B32B 11/046* (2013.01); *B32B 11/10* (2013.01); *B32B 27/12* (2013.01); *B32B 27/16* (2013.01); *B32B 37/153* (2013.01); *D06N 5/00* (2013.01); *B29C 48/07* (2019.02); *B29C 48/155* (2019.02); *B32B 37/08* (2013.01); *B32B 38/0004* (2013.01); *B32B 39/00* (2013.01); *B32B 2255/10* (2013.01); *B32B 2255/24* (2013.01); *B32B 2262/06* (2013.01); *B32B 2262/101* (2013.01); *B32B 2264/107* (2013.01); *B32B 2307/58* (2013.01); *B32B 2307/7265* (2013.01); *B32B 2419/04* (2013.01); *B32B 2419/06* (2013.01); *D06N 5/003* (2013.01); *D06N 2205/10* (2013.01); *D06N 2209/1692* (2013.01); *D06N 2211/06* (2013.01)

(56) References Cited

U.S. PATENT DOCUMENTS

| | | | |
|---|---|---|---|
| 5,902,683 A | 5/1999 | Sieloff | |
| 6,228,785 B1 | 5/2001 | Miller et al. | |
| 6,341,462 B2 | 1/2002 | Kiik et al. | |
| 6,564,682 B1 | 2/2003 | Leavell | |
| 6,546,688 B1 * | 4/2003 | Parsons | E04D 1/265 52/408 |
| 6,709,994 B2 | 3/2004 | Miller et al. | |
| 6,808,785 B1 | 10/2004 | Friedman et al. | |
| 6,864,195 B2 | 3/2005 | Peng | |
| 7,048,990 B2 * | 5/2006 | Koschitzky | B32B 37/24 428/141 |
| 7,070,843 B2 | 7/2006 | Bartek et al. | |
| 7,070,844 B2 | 7/2006 | Bartek | |
| 7,140,153 B1 | 11/2006 | Humphreys et al. | |
| 7,442,270 B2 | 10/2008 | Bartek | |
| 7,442,658 B2 * | 10/2008 | Rodrigues | B32B 11/02 442/20 |
| 7,670,668 B2 | 3/2010 | Greaves et al. | |
| 7,851,051 B2 | 12/2010 | DeJarnette et al. | |
| 7,867,562 B2 * | 1/2011 | Wisniewski | B05D 3/042 118/325 |
| 8,226,790 B2 | 7/2012 | Rodriques et al. | |
| 8,266,861 B2 | 9/2012 | Koch et al. | |
| 8,277,881 B2 | 10/2012 | Khan et al. | |
| 8,309,169 B2 * | 11/2012 | Teng | B05D 1/30 427/186 |
| 8,333,040 B2 | 12/2012 | Shiao et al. | |
| 8,389,103 B2 | 3/2013 | Kiik et al. | |
| 8,557,366 B2 | 10/2013 | Harrington, Jr. et al. | |
| 8,826,607 B2 | 9/2014 | Shiao et al. | |
| 2002/0166637 A1 * | 11/2002 | Kobayashi | B29C 47/0066 156/555 |
| 2003/0188503 A1 | 10/2003 | Parsons | |
| 2004/0014385 A1 | 1/2004 | Greaves, Jr. et al. | |
| 2004/0081789 A1 | 4/2004 | Kim | |
| 2004/0177596 A1 * | 9/2004 | Jolitz | B29C 43/222 53/447 |
| 2004/0178532 A1 * | 9/2004 | Jolitz | B29C 43/222 264/151 |
| 2005/0210808 A1 | 9/2005 | Larson et al. | |
| 2009/0260309 A1 | 10/2009 | Humphreys et al. | |
| 2010/0005745 A1 * | 1/2010 | Harrington, Jr. | E04D 1/20 52/409 |
| 2010/0212235 A1 | 8/2010 | Barrego | |
| 2011/0017278 A1 | 1/2011 | Kalkanoglu et al. | |
| 2011/0104461 A1 | 5/2011 | Grubka | |
| 2011/0197534 A1 * | 8/2011 | Belt | E04D 1/26 52/520 |
| 2011/0232220 A1 * | 9/2011 | Belt | E04D 1/26 52/521 |
| 2014/0259820 A1 * | 9/2014 | Humphreys | E04D 1/26 40/299.01 |
| 2016/0369509 A1 * | 12/2016 | Leitch | E04D 1/20 |

* cited by examiner

PROCESS FOR IN-LINE EXTRUSION OF COATING ONTO ROOFING SHINGLES DURING MANUFACTURING AND ROOFING SHINGLES MADE BY THE PROCESS

REFERENCE TO RELATED APPLICATIONS

Priority is hereby claimed to the filing date of U.S. provisional patent application 62/180,377 filed on Jun. 16, 2015 and to the filing date of U.S. provisional patent application 62/296,903 filed on Feb. 18, 2016. The content of these provisional patent applications is hereby incorporated by reference.

TECHNICAL FIELD

This disclosure relates generally to the manufacturing of asphalt roofing shingles and more specifically to the application of films or coatings such as thin films of polymeric material to a web of shingle material during the manufacturing process.

BACKGROUND

Asphalt shingles generally are composed of a support layer or substrate, traditionally a felted fibrous layer or a fiberglass or glass mat layer. The support layer is saturated and impregnated with a waterproofing agent, such as a bituminous composition such as a blown molten petroleum-based asphalt composition. Excess asphalt is removed by scraping, leaving a waterproof asphalt saturated substrate. Subsequently, the asphalt saturated substrate is coated on one or both sides and to a predetermined thickness with a molten bituminous coating that may contain a finely ground mineral stabilizer or other fillers. This coating is sometimes referred to as a "filled coating."

While the filled coating is still in a plastic or molten state, ceramic-coated mineral granules, normally opaque to ultraviolet light, are dropped and pressed onto at least the weather exposed portions of the filled coating. The granules become embedded in and cover the filled coating. When exposed to sunlight on a roof, the granules act to protect the filled coating and the saturated substrate from ultraviolet rays or actinic effects of the sun, as well as providing a decorative aesthetic. Cellophane strips may be applied to be back surface of the web to prevent the self-seal adhesive of stacked shingles from sticking in a bundle. A thin layer of powdered mineral matter or fine sand also may be applied to the back surface in a process known as back dusting. The strips and back dusting material prevent individual shingles cut from a finished web from sticking together when stacked in bundles. Traditional prior art shingle webs can tend to be relatively inflexible during manufacturing. This, in turn, can lead to damage during the manufacturing process as webs of shingle material encounter machine line bend radiuses and other stresses along the line.

The application of a polymeric film to the back and/or front surfaces of an asphalt coated shingle web during manufacturing has previously been suggested. When applied to the back surface, such film can eliminate the need for back dusting since the film itself provides the desired non-stick properties. The film can provide additional advantages such as enhanced adhesion along the glue lines between courses of shingles due to the more uniform and dust free surface of the film compared to a traditional back dusting material. It may also be advantageous to apply films in areas that will become other regions of an asphalt shingle such as, for instance, in areas that will become the headlap portions of shingles. Even granule covered portions that will be exposed to the environment when shingles are installed may incorporate a polymeric film to provide greater protection from exposure to the elements as well as manufacturing efficiencies.

With regard to the application of films to webs of shingle material, the prior art suggests continuously withdrawing a sheet of film from a prefabricated roll and merging the film with a moving web of shingle material as the web and the film are conveyed in a downstream processing direction. However, certain problems are inherent in such a technique. For instance, in order for a film to be rolled onto a prefabricated roll for use, the film must be strong enough to resist tearing, folding, and other damage during the rolling process and during the process of applying the film to a web of shingle material. The thickness of the polymeric material has to be sufficient to meet these criteria. However, such thicknesses often are significantly greater than is necessary to provide the desired benefit to shingles. Accordingly, the volume of polymeric material and thus manufacturing costs are increased. Also, the sourcing, storage, and manipulation of large rolls of polymeric film add extra complication and cost. Further, just as with rolls of substrate, the rolls of film must be monitored during manufacturing and mechanisms must be provided to replace rolls as they become empty without having to stop the manufacturing line.

A need exists for a method of applying films and other coatings to a moving web of shingle material during the manufacturing process that addresses and resolves the above and other problems and shortcomings with prior art methods. It is to the provision of such a method, and of shingle products produced by the method, that the present invention is primarily directed.

SUMMARY

Briefly described, a method is disclosed for applying a thin polymeric film to a moving web of asphalt shingle material during manufacturing. The method includes extruding the material of the film such as a polymer in a molten or liquid form onto the web as the web moves in a downstream processing direction. The extruded film material is then allowed to cure to form a thin film that is bonded to the web of shingle material. The material may be extruded as a sheet or curtain that drops onto the moving web. Alternatively, it may be applied with a controlled extrusion die such as a slot die that ejects the liquid film material onto the moving substrate under pressure. The material can be stored efficiently as pellets that are melted or otherwise liquefied just prior to application. Accordingly, the need to source, ship, store, and handle large rolls of prefabricated film is eliminated, as is the need to accommodate replacement of depleted rolls without stopping the manufacturing line.

The film can be applied across the entire width of a web of shingle material. This may be desirable when the film is applied to the back surface of the web as a substitute for a traditional back dusting. Alternatively, the film may be extruded just onto preselected locations across the width of a web of shingle material such as, for instance, locations that will become the headlap portions of finished shingles. It is even envisioned that the extrusion of a polymeric film may substitute for application of a traditional filled asphalt coating. In either event, the extrusion rate of the liquid film material is metered and controlled such that the resulting film applied to the web of shingle material is just thick enough to provide a desired advantage but not so thick as to increase cost unnecessarily.

Webs of shingle material incorporating films in place of back dusting material and/or filled asphalt coatings can be significantly more flexible than webs of traditional shingle material, and thus less prone to damage as the web moves down the manufacturing line. Further, lamination adhesives between the layers of laminated shingles can form a significantly better bond to the extruded polymeric film because there is far less loose dust and inconsistency between the layers compared to traditional back dusted shingles.

In an alternative embodiment, a thin film of polymeric material is extruded onto the back surface of a shingle substrate that is not saturated with an asphalt sealant. The polymer film forms a waterproof barrier and replaces the traditional asphalt saturation coat. A coating of filled asphalt may then applied to the upper surface of the substrate. Granules dropped onto the hot filled asphalt coating complete the web of shingle material.

It will thus be seen that a novel method is now provided for applying thin films to moving webs of shingle material during the manufacturing of shingles that addresses successfully the problems and shortcomings of the prior art and provides additional novel advantages. These and other aspects, features, and advantages will become more apparent upon review of the detailed description set forth below when taken in conjunction with the accompanying drawing figures, which are briefly described as follows.

DETAILED DESCRIPTION

The invention will now be illustrated and described in terms of embodiments that exemplify various modes of carrying out the method of the invention. In the description that follows, the word "film" will be used for ease of discussion to refer to material that is applied to a moving web of shingle material. It will be understood, however, that the word "film" as used herein is intended to include and should be construed to include a layer of any material that is desired to be applied to the web. For example, and without limitation, "film" might include a thin layer of polymeric material such as a polyethylene, polypropylene, polyvinyl chloride (PVC), a Nylon, a Polyester, and all polyolefins. The invention illustrated herein is intended to encompass films created from any polymer capable of being extruded into a thin film. "Film" might also include a thin layer of an organic material such as an asphalt composition or a layer of adhesive or any other material that is desired to be applied to a web of shingle material during the manufacturing process.

Figure 1:
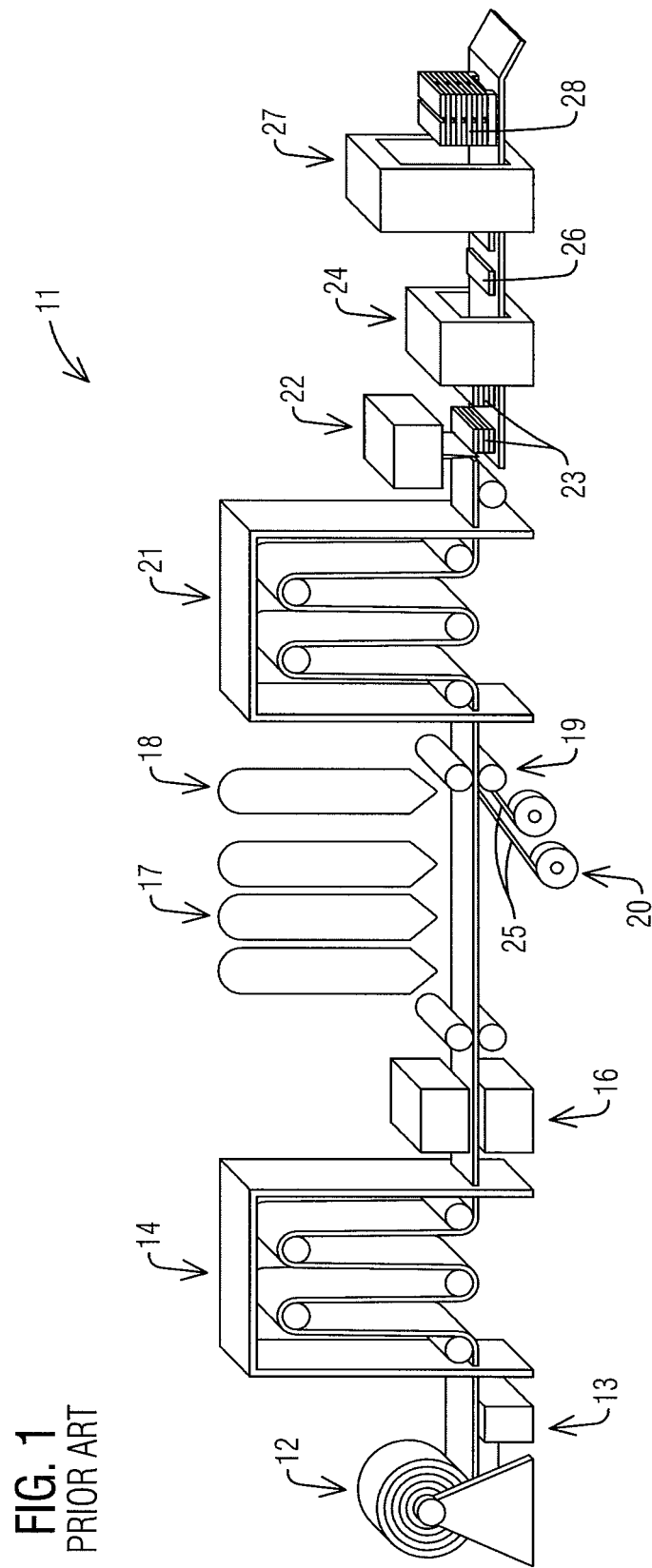
FIG. 1 is a greatly simplified schematic illustration of a typical prior art asphalt shingle manufacturing line showing many of the various processing stations along the processing path.

Reference will now be made in more detail to the drawing figures, wherein like reference numerals indicate like components throughout the views. FIG. 1 is a simplified schematic illustrating a typical prior art asphalt shingle manufacturing process. The process is well understood by those of skill in the art, and so need not be described in great detail here. However, it is believed to provide useful background for the discussion that follows. Briefly, an asphalt shingle manufacturing line 11 includes a substrate supply station 12 at the upstream end of the manufacturing line. The substrate, usually in the form of a non-woven glass mat or fiberglass web, is drawn from a large roll across a splicing table 13 to accommodate splicing of two webs together when rolls must be changed out. The web is wide enough to accommodate the cutting of multiple shingles from its width at the end of the process. An accumulator or dry looper 14 accumulates a sufficient length of the substrate web so that manufacturing can continue as rolls of substrate material are changed.

The substrate web next is conveyed through a coating station 16, which may include a saturator that saturates the web with molten asphalt to create a waterproof barrier and a coater that applies a metered layer of filled asphalt to the saturated web. The web then passes beneath a granule application station 17. Here, protective ceramic-coated clay granules are dropped or otherwise delivered onto the hot molten filled asphalt coating, at least in regions that will become exposed areas of shingles, to form a UV protective coating. Loose granules that do not stick to the asphalt are recovered with the use, for example, of a clay drum (not shown). A back dusting station 18 applies backing surface materials such as powdered stone to the back side of the web of shingle material, which will become the back surfaces of finished shingles. The backing surface material prevents or helps to prevent shingles from sticking together when bundled. Although not shown in the schematic drawing of FIG. 1, the web may be flipped over in known ways between the granule application station 17 and the backing material application station 19 so that the backing material can be applied as a dropping curtain to the back side of the substrate.

Cellophane strips 25 are applied from rolls 20 to the back of the web of shingle material. These cellophane strips are positioned across the web such that when shingles are cut from the web and stacked in bundles, the cellophane strip of each shingle will overlie the glue strips of shingles below to prevent the glue strips from sticking shingles together in the bundle. The web of shingle material, still hot, then passes through a cooling accumulator or cooling looper 21 where the substrate cools and is accumulated so that manufacturing can continue in the event of a problem upstream of the cooling accumulator 21, such as the need to change the rolls 20 of cellophane strip material.

The web of shingle material is then cut into individual shingles at a cutting station 22 and stacked into bundles 23 at a stacking station. These stacked bundles are then wrapped at a wrapping station 24 to form wrapped bundles, which may then be palletized 28 at a palletizing station 27. A wide gamut of variations of the just described process may be implemented. For instance, in the manufacture of layered shingles, additional steps may include cutting a top layer strip from the web of shingle material, aligning the top layer strip over a bottom layer strip, and bonding the layers together with an appropriate adhesive. However, FIG. 1 illustrates the typical basic sequence of events in the manufacturing of asphalt shingles.

With the forgoing in mind, it has been found that some of the typical manufacturing steps and the finished shingles themselves can be enhanced through the use of films applied to the web of shingle material. In one particular pertinent example, a film, usually of a polymeric material, can be applied to the back surface of the web of shingle material in place of a back dust material. For example, instead of applying powdered mineral or glass to the back of the web of shingle material, a thin film of polymeric material may be applied. Such a material can function as well as or better than traditional back dusting materials, can provide additional advantages, and can be more economical and less complicated to apply. Films can also be applied over the head lap portions of shingles as protective barriers or even over the exposed areas and tabs to provide additional UV protection and other advantages.

In the past, the application of films to certain portions of asphalt shingles during the manufacturing process has been suggested. U.S. patent application 2010/0005745 of Harrington, Jr., for instances, discloses a roofing shingle with a polymer film backing. A film of polymeric material is applied from a prefabricated roll onto the back of a web of shingle material during the manufacturing process. It is asserted that the film alleviates the need for back dusting material, eliminates the back dusting step, and prevents shingles from sticking together. However, as mentioned above, application of films to a shingle substrate from prefabricated rolls is problematic since the film must be thicker than is necessary to provide the benefit, rolls of film must be changed out when the rolls are empty, and sourcing, shipping, and storage of large rolls is necessary.

Figure 2:
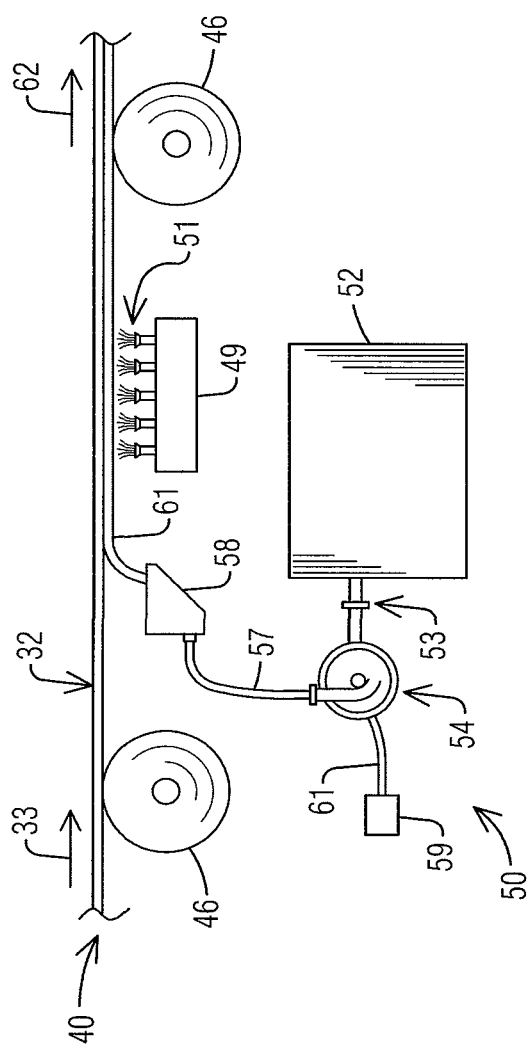
FIG. 2 is a simplified schematic illustration of a method of applying films to a moving web of shingle material according to one exemplary embodiment of the invention.

FIG. 2 illustrates, in highly simplified schematic form, one embodiment of an apparatus for carrying out the methodology of the present invention. According to the method, polymeric material in a molten or otherwise liquefied state is extruded onto the moving surface of a web of shingle material and allowed to cure to form a film. The invention will be detailed within the context of extruding a film onto the back surface of the web of shingle material as a substitute for application of back dusting material. It will be understood, however, that the invention includes extrusion of films onto other surfaces and in patterns that will position the films on any desired portions of finished shingles.

A film extrusion station 50 is located along a shingle manufacturing line 40 at a preselected location. In the example of FIG. 2, the station 51 is located downstream of the saturation and filled asphalt coating stations. Here, a web of shingle material 32 comprises a saturated substrate having a filled asphalt coating on the top surface of the substrate. Appropriate supports such as rollers 46 support the web of shingle material as it traverses the film extrusion station 50. A vessel 52 contains a supply of molten or otherwise liquefied polymeric material that is maintained at a predetermined desired to temperature and viscosity. A high pressure pump 54 is in communication with the vessel 52 via conduit 53 such that the pump 54 can draw liquefied polymeric material from the vessel. Alternatively, a polymer pellet hopper may supply polymer pellets to an extruder, which heats and melts the pellets as they are conveyed by internal screws along the extruder.

An extrusion die 58 is located adjacent the bottom surface of the web of shingle material. Here it is shown below the web, but the web might just as well be inverted and the extruder located above the web. The extrusion die 58 may be a slot die having a long slot-shaped nozzle through which material is ejected. Alternatively, the extrusion die 58 may be any type of die capable of ejecting a stream or streams, perhaps configured as a thin sheet or curtain, of liquefied polymeric material under pressure toward the web of shingle material 32. In any case, the extrusion die 58 has its inlet port coupled to the outlet of the high pressure pump 54 through high pressure conduit 57, or, if an extruder is used, to the outlet of the extruder. The pump, when actuated, delivers liquefied polymeric material under high pressure through the conduit 57 to the extrusion die 58, which ejects the polymeric material toward the web of shingle material 32. In a preferred embodiment, the extrusion die 58 comprises one or more slot dies that eject a thin curtain or curtains of polymeric material toward the web.

The high pressure pump 54 is of a type that can be controlled to deliver polymeric material at a predetermined pressure within a range of pressures. A machine controller 59, which may be a computer or a programmable logic controller (PLC), is operatively connected to the high pressure pump 54 via an appropriate connection 61. The machine controller 59 is programmed to monitor various parameters of the production process and to control the pump 54 such that a predetermined volume-per-second of polymeric material at a predetermined pressure is delivered to the extrusion die. The predetermined volume and pressure are calculated or otherwise selected such that a film of polymeric material having a predetermined thickness is deposited on the moving web of shingle material at the line speed of the web, which may be about 500 feet per minute or higher.

In the illustrated embodiment, the extrusion die is configured to apply a film of material to the bottom surface of the web. The film may span the width of the web from one side to the other, or may be applied only in predetermined regions. This bottom surface of the web will become the back surfaces of finished shingles and of shingle layers, such as a dragon tooth layer, when shingles and layers are cut from the web of shingle material. The extrusion die in this embodiment ejects a curtain or sheet of liquefied polymeric material toward the bottom surface of the web so that the material initially sticks to the saturated substrate, which is still hot and partially molten. A chilled air blower 59 or other chilling mechanism (such as a wet looper for example) may be situated just downstream of the extrusion head 58. The blower 59 is configured to direct streams of chilled air 51 toward the liquefied polymeric material just applied to the saturated substrate. This cures and hardens the polymeric material into a thin film 61 that is bonded to the back surface of the saturated substrate. The web then moves on in direction 62 to other stations such as a granule application station where the fill coated top surface of the web receives protective ceramic coated granules.

In the just described embodiment, the film of polymeric material is applied in lieu of the application of a back dusting material and in lieu of traditional protective cellophane strips. These elements and their stations along the manufacturing line are eliminated. The extruded-on film performs the functions of both of these traditional elements and, in fact, performs them better than the traditional elements. For example, the film prevents finished shingles from sticking together when stacked into bundles and also prevents the glue strips of one shingle from sticking to the back of an overlying shingle in the bundle. As an added benefit, the film is much smoother and dust free than traditional back dusting material and forms a better surface for adhesive bonding between layers of architectural shingles and between shingles of adjacent courses on a roof.

Extrusion of films onto webs of shingle material according to the present invention provides advantages in addition to those discussed above. For example, since it does not rely on prefabricated rolls of polymeric film, the application of film can continue indefinitely without the need to stop and change out rolls when one roll is empty. The extrusion mechanism is simpler, self-contained, and more reliable than mechanical mechanisms for applying back dust material to a web of shingle material. Further, the application of the film is controllable in real time simply through a command from the controller 59 to the pump 54 (or extruder). The extrusion die itself can be configured and positioned to apply film to virtually any portion of the substrate web so that the film ends up on a desired portion of the finished shingles. Film can also be applied in patterns by starting and stopping the ejection of material from the extrusion die as required or providing multiple extrusion dies.

Figure 3:
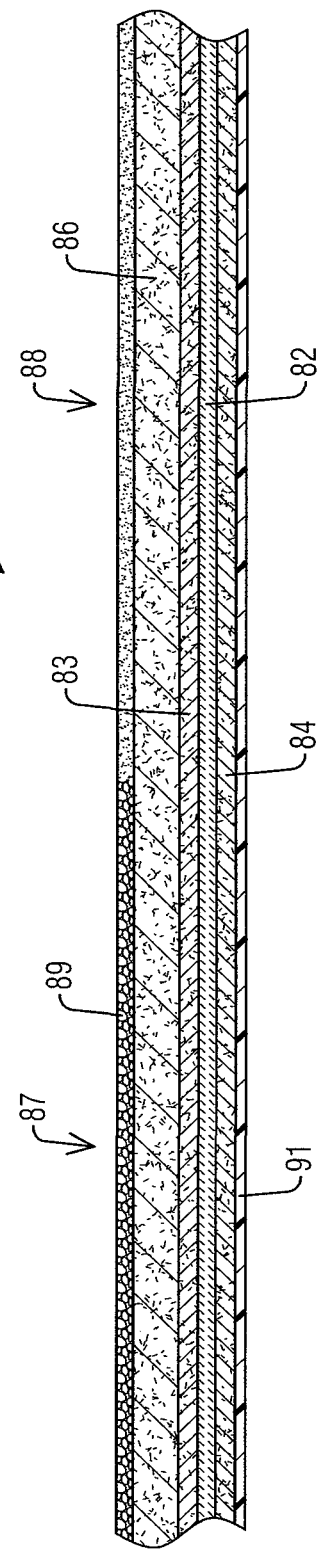
FIG. 3 is a lateral cross-section showing one example of a shingle manufactured according to the method of this invention.

FIG. 3 shows in lateral cross-section a simple shingle manufactured according to the method described above. The shingle 81 comprises a substrate material 82 at its core. The substrate material may be a glass mat, and may be saturated with sealing asphalt, which forms a thin waterproof layer 83 on top of the substrate and a thin layer 84 on the bottom of the substrate 82. A layer or coating of filled asphalt 86 resides atop the saturated substrate on the top portion of the shingle. Protective ceramic coated granules 89 are embedded in the filled asphalt 86 in the exposed portion 87 of the shingle to provide protection from the elements. The headlap portion 88 of the shingle also may have some less expensive granules applied to its surface and/or may have a dusting of material to prevent sticking when shingles are stacked in bundles. A thin film 91 of a polymeric material covers the back of the shingle. The film 91 is extruded onto the back of the shingle and cooled as discussed in detail above and thus is bonded to the saturated substrate. The film 91 provides various advantages such as preventing sticking by replacing a traditional backing material, increasing the reliability of the bond between shingle layers, and rendering the shingle more flexible.

In the forgoing description, application of a polymeric film onto the back of a substrate that has been pre-saturated with asphalt has been discussed. It has been found, however, that an extruded film of polymeric material on the back surface of a shingle substrate can provide advantages beyond elimination of a back dust and cellophane strips. Specifically, the extrusion of a thin polymeric film onto a shingle substrate such as a glass mat can itself seal the substrate against moisture penetration rendering it waterproof. This can eliminate the need to saturate the substrate with asphalt to form the seal. This concept will be described with reference to FIGS. 4 and 5.

Figure 4:
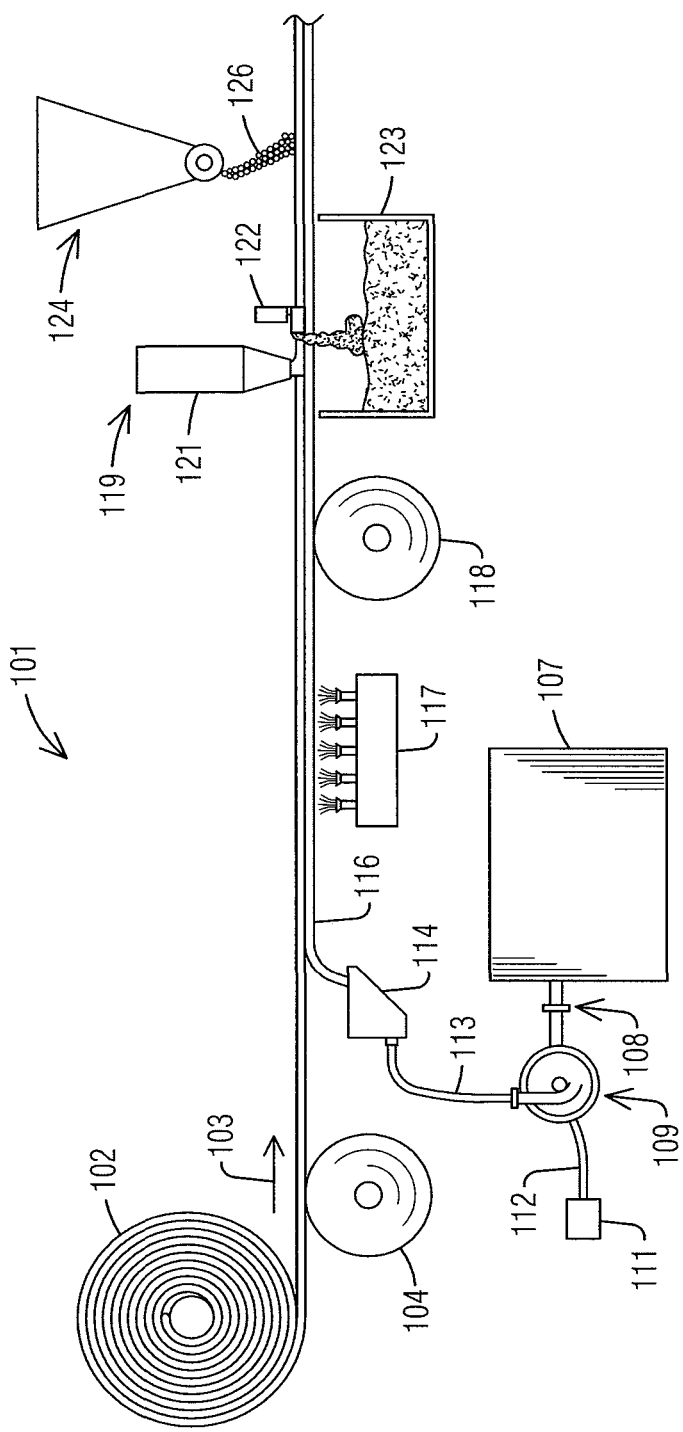
FIG. 4 is a greatly simplified schematic illustration of a method of manufacturing shingles with applied polymeric films in lieu of a saturation coating on the shingle substrate.

FIG. 4 shows, in greatly simplified form, a shingle manufacturing process that incorporates an alternate embodiment of the invention. A roll 102 of substrate material, which may be a glass mat or an organic felt, is paid out along a processing path in direction 103. The substrate may pass over a splicing table (not shown), through a felt looper or accumulator (not shown), and over and under various support rollers such as roller 104. Ultimately, the web of substrate passes a polymer extrusion die 114 that, as in FIG. 2, is fed with molten polymer 116 from a reservoir 107 and a pump 109 through conduit 113. Alternatively, a traditional internal screw extruder may be used to melt the polymer 116 and deliver it to the extrusion die. Also as in FIG. 2, the pump 109 (or an extruder) is controlled by a controller 111 to eject a sheet or curtain of molten polymeric material onto the bottom surface of the web of substrate material at a predetermined rate. This, in conjunction with the line speed at which the substrate material is conveyed, determines the thickness of a polymeric film deposited onto the bottom surface of the mat of substrate material.

The film of polymeric material is substantially molten when first applied and must be cooled and cured. For this purpose, the substrate 106 with polymer film coating 144 (FIG. 5) may pass various cooling stations, illustrated in FIG. 4 by chilled air blowers 117, and chilled rollers 118. Of course, the arrangement of these elements at the cooling stations may be far more complex than illustrated schematically in FIG. 4 but such arrangements are generally known to those of skill in the art. When the polymer film coated substrate is sufficiently cooled, it is conveyed through an asphalt coating station 119 where a filled asphalt coating is applied to the upper surface of the substrate. Again, the process of applying the filled asphalt is generally known to the skilled artisan, but may include an asphalt head that pours hot asphalt onto the upper surface of the substrate and one or more doctor blades or metering rollers 122 to meter the amount of asphalt that remains on the substrate. Excess asphalt removed by the doctor blade or roller may fall into a reservoir 123 for subsequent use.

The filled asphalt coated polymer filmed substrate next passes the granule application station 124, wherein ceramic coated granules 126 are deposited onto the hot molten asphalt applied at station 119. Downstream of the granule application station 124, the resulting web of shingle stock may be cooled, the granules may be pressed into the asphalt, and the web may be cut into shingles in the traditional way before being bundled, wrapped, and palleted for shipment.

Figure 5:
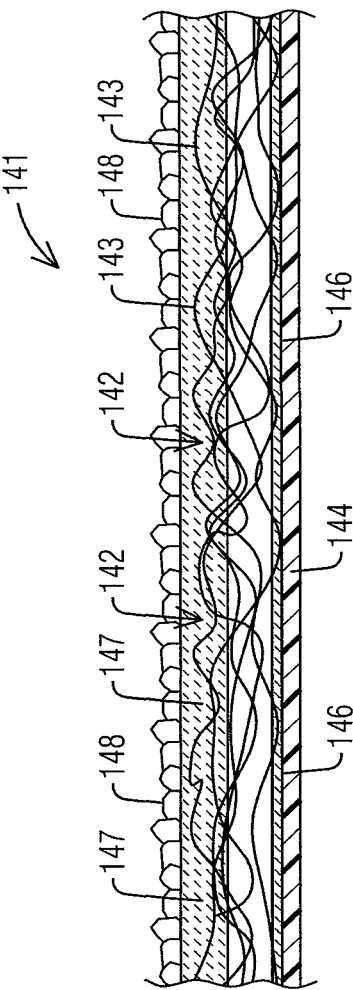
FIG. 5 is a cross-sectional illustration of a layered shingle material generated by the method illustrated in FIG. 4.

FIG. 5 illustrates in an exaggerated thickness cross-section of a shingle material web 141 that results from the methodology of this embodiment. The shingle web comprises a mat 142 of substrate material that may be a glass mat, organic felt, or other appropriate material. If a glass mat, the substrate material may comprise multitudes of randomly oriented glass fibers 143 bond together with appropriate binders. The bottom surface of the mat is covered with a film of polymeric material 144 applied at the polymer application station as discussed above. Since the polymer is extruded in a molten form onto the substrate mat, and particularly if the mat itself is heated before application, a strong unitary bond 146 is formed between the mat and the polymer film.

The thickness of the film can vary widely depending upon the properties it is intended to provide. For instance, thinner films may suffice to provide a moisture barrier while thicker films may supply rigidity, penetration resistance, or other properties. Generally, the thickness of the film 144 can range from about 5 microns to about 150 microns. To provide a simple moisture barrier, the film can be significantly thinner than pre-fabricated films applied from a supply roll. A thin polymer film 144 between about 5 microns and about 15 microns thick has been found to provide a waterproof moisture barrier comparable to that provided by the traditional method of saturating the substrate with an asphalt sealant. The shingle stock 141 further comprises a layer of filled asphalt 147 within which ceramic coated granules 148 are embedded in the customary manner.

Roofing shingles made from the mat 141 according to this embodiment exhibit improvements and advantages over shingles made from traditional asphalt saturated and fill coated mat. For example, such shingles are generally lighter and more flexible than standard shingles, making them suitable for use in many climates. As with the first embodiment, the need to backdust and apply non-stick cellophane strips to the backs of shingles is eliminated, which eliminates complex hardware from the manufacturing process and reduces manufacturing time. Significantly, the traditional need to waterproof the shingle substrate by initially saturating it with liquid asphalt is eliminated as a waterproof seal is formed by the extruded polymer film. This can reduce manufacturing costs and reduce asphalt usage. The polymer film also has proven to be surprisingly slip resistant, which can be a benefit during shingle installation.

The invention has been described herein in terms of preferred embodiments and methodologies considered by the inventors to represent the best modes of carrying out the invention. It will be clear, however, that a wide gamut of additions, deletions, and modifications, both subtle and gross, may be made to the illustrated exemplary embodiments without departing from the spirit and scope of the invention itself. For example, while the molten polymer is illustrated being ejected or sprayed in sheets or curtains from below the moving substrate, it could just as well be applied from above and the substrate inverted prior to additional processing steps. While not explicitly illustrated, it is believed to be advantageous when using a glass mat substrate to heat the substrate before applying a polymer film. This forms a better and more monolithic bond between the substrate web and the polymer film applied thereto. In fact, manufacture of the glass mat itself might well be incorporated into the overall process. In such case, a fiberglass precursor might be passed through an oven to bond the glass fibers together with appropriate binders at an upstream location. The polymer film might then be extruded directly onto the resulting fiberglass substrate before it cools. These and other modifications might well be made by one of skill in the art, all within the scope of the invention.

What is claimed is:

1. A method of fabricating roofing shingles comprising the steps of:
   (a) conveying a mat of substrate material having a first and a second surface in a downstream direction;
   (b) ejecting a stream of molten polymeric material directly onto the first surface of the mat of substrate material as the mat is conveyed in the downstream direction to deposit a film of molten polymeric material on the first surface;
   (c) cooling the film of molten polymeric material to cure the film, bond the polymeric material to the mat of substrate material, and form a waterproof coating on the mat of substrate material;
   (d) coating the second surface of the mat of substrate material with a bituminous coating that is at least partially molten;
   (e) embedding ceramic-coated granules into the bituminous coating to form a protective layer and to produce roofing shingle stock;
   (f) cutting the roofing shingle stock to form individual shingles; and
   (g) bundling the individual shingles for storage and shipment;
   step (b) being performed before step (d); and
   step (c) is conducted before step (e).

2. A method of fabricating roofing shingles as claimed in claim 1 where in step (a) the mat of substrate material comprises a glass mat.

3. A method of fabricating roofing shingles as claimed in claim 1 where in step (a) the mat of substrate material comprises an organic felt mat.

4. A method of fabricating roofing shingles as claimed in claim 1 wherein the first surface of the mat of substrate material will become back surfaces of shingles fabricated by the method.

5. A method of fabricating roofing shingles as claimed in claim 1 wherein the second surface of the mat of substrate material will become top surfaces of shingles fabricated by the method.

6. A method of fabricating roofing shingles as claimed in claim 1 further comprising saturating the mat of substrate material with a bituminous material prior to step (b).

7. A method of fabricating roofing shingles as claimed in claim 1 wherein step (c) comprises subjecting the film of polymeric material to an air stream.

8. A method of fabricating roofing shingles as claimed in claim 1 wherein step (c) comprises passing the mat of substrate material over chilled rollers.

9. A method of fabricating roofing shingles as claimed in claim 1 wherein step (b) comprises ejecting the stream of molten polymeric material as a curtain.

10. A method of fabricating roofing shingles as claimed in claim 9 wherein step (b) further comprises forcing the molten polymeric material through a slot die toward the first surface of the mat of substrate material.

11. A method of fabricating roofing shingles as claimed in claim 1 further comprising the step of ejecting a stream of molten polymeric material onto at least a portion of the second surface of the mat of substrate material.

12. A method of fabricating roofing shingles as claimed in claim 11 further comprising ejecting a stream of molten polymeric material onto the portion of the second surface of the mat of substrate material that will become a headlap portion of shingles cut from the roofing shingle stock.

* * * * *